(12) United States Patent
Balzer

(10) Patent No.: US 7,108,169 B2
(45) Date of Patent: Sep. 19, 2006

(54) TABBED STORAGE SLEEVE AND RETRIEVAL SYSTEM FOR PLANAR OBJECTS AND DISC MEDIA

(76) Inventor: Loren Dean Balzer, 4847 Hopyard, Suite 401, Pleasanton, CA (US) 94588

( * ) Notice: Subject to any disclaimer, the term of this patent is extended or adjusted under 35 U.S.C. 154(b) by 169 days.

(21) Appl. No.: 10/682,324

(22) Filed: Oct. 9, 2003

(65) Prior Publication Data

US 2004/0129584 A1    Jul. 8, 2004

Related U.S. Application Data

(63) Continuation-in-part of application No. 09/757,596, filed on Jun. 27, 2001, now abandoned.

(51) Int. Cl.
*B65D 27/00* (2006.01)
(52) U.S. Cl. .................. 229/67.1; 206/308.1
(58) Field of Classification Search ...... 229/67.1–67.4, 229/300–301; 206/308.1, 312–313, 311
See application file for complete search history.

(56) References Cited

U.S. PATENT DOCUMENTS

| | | | | |
|---|---|---|---|---|
| 661,690 A | * | 11/1900 | Forney | 229/68.1 |
| 1,344,394 A | * | 6/1920 | Hoffman | 229/301 |
| 2,771,076 A | * | 11/1956 | Rudolph | 206/312 |
| 3,376,872 A | * | 4/1968 | Durham | 206/313 |
| 4,784,508 A | * | 11/1988 | Shannon | 402/79 |
| 5,545,087 A | * | 8/1996 | Seward | 462/6 |
| 5,638,953 A | * | 6/1997 | House | 206/308.1 |
| 5,722,692 A | * | 3/1998 | Abramov | 281/43 |
| 5,725,093 A | * | 3/1998 | Yamaguchi et al. | 206/308.1 |
| 5,966,852 A | * | 10/1999 | Drzewiecki | 40/360 |
| 6,367,689 B1 | * | 4/2002 | Flynn et al. | 229/68.1 |
| 6,845,864 B1 | * | 1/2005 | Taw et al. | 206/308.1 |

* cited by examiner

*Primary Examiner*—Jes F. Pascua
(74) *Attorney, Agent, or Firm*—Fliesler Meyer LLP

(57) ABSTRACT

Storage devices in accordance with embodiments of the present invention, and systems utilizing such storage devices, can allow for archival of various articles, particular planar articles such as electronic media, records, papers, etc. Such a storage device can comprise a sleeve having a pocket for receiving said article and one or more tabs connected with the sleeve. In some embodiments, said one or more tabs can be removably connected with the sleeve, while in other embodiments, multiple sleeves can have one or more tabs formed in various shapes, sizes, and/or colors and arranged in varying positions along an edge of the sleeve. A system utilizing such storage devices can allow for archival of various articles such that the location of an article can be readily identified by identifying one or more tabs connected with the corresponding sleeve.

2 Claims, 11 Drawing Sheets

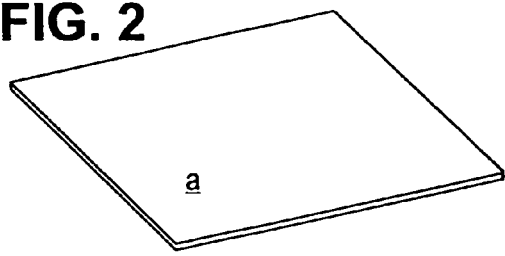
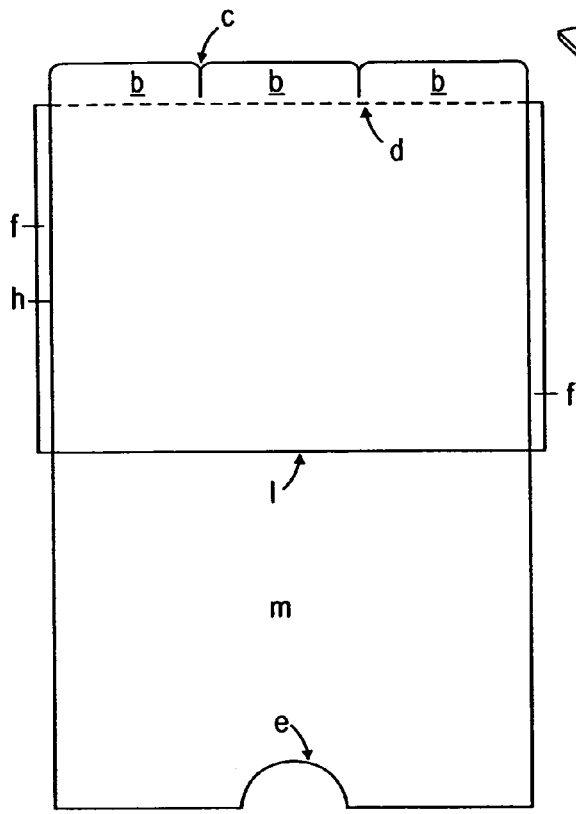
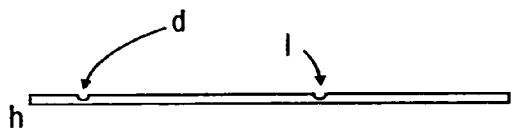
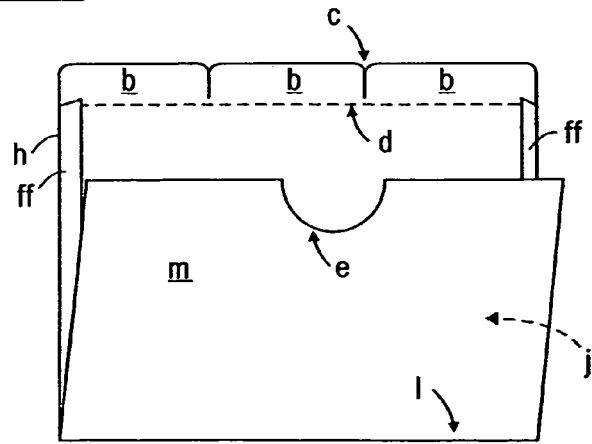

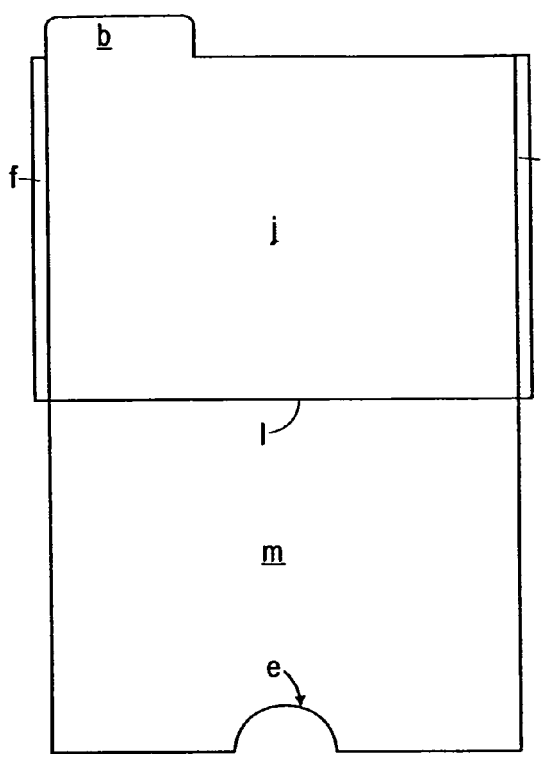
FIG. 21
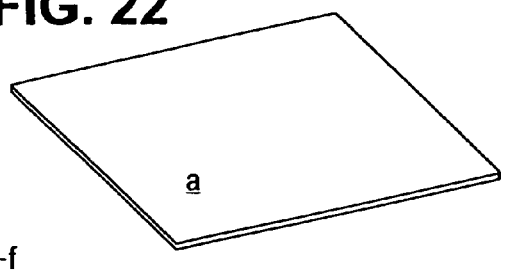
FIG. 22
FIG. 23
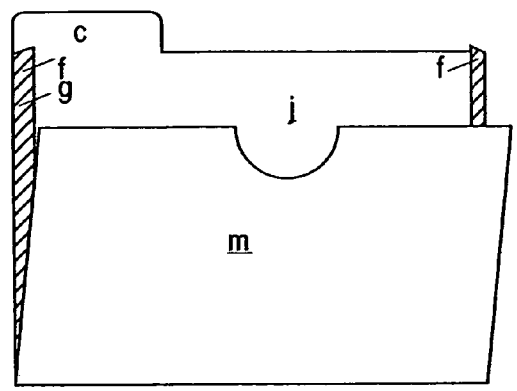
FIG. 24
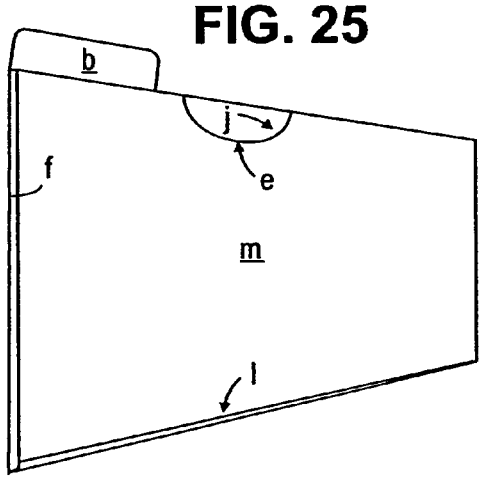
FIG. 25
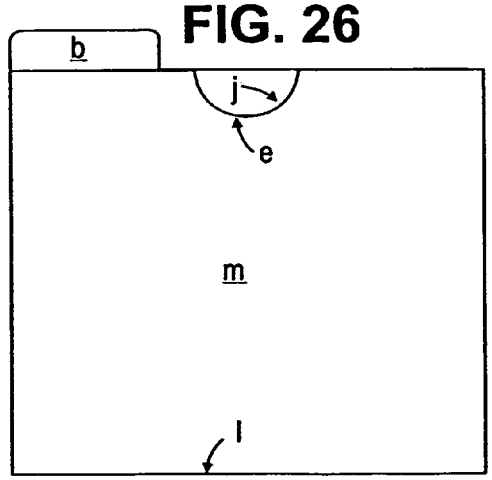
FIG. 26

FIG. 27
FIG. 28
FIG. 29
FIG. 30
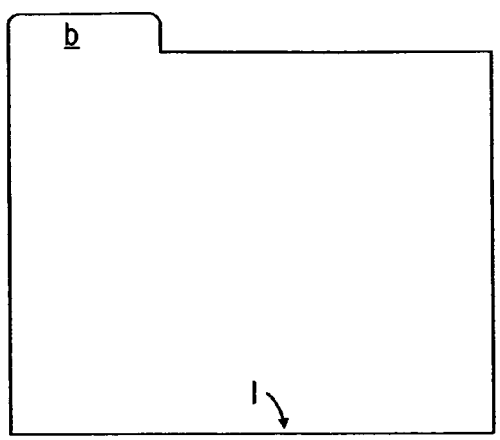
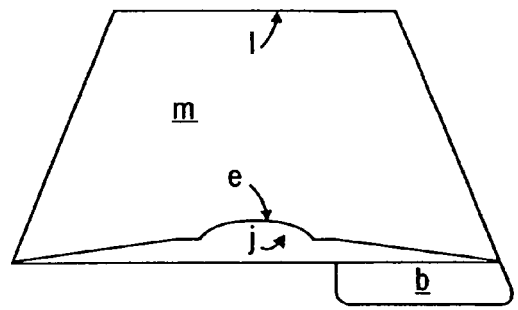
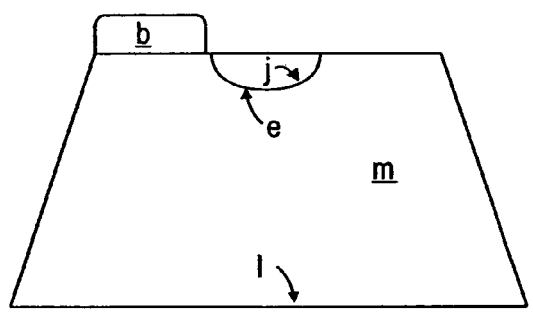
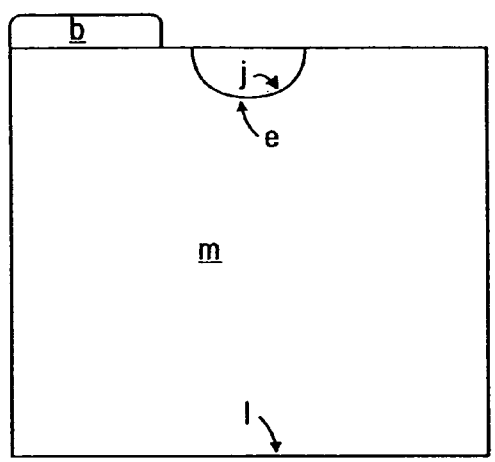
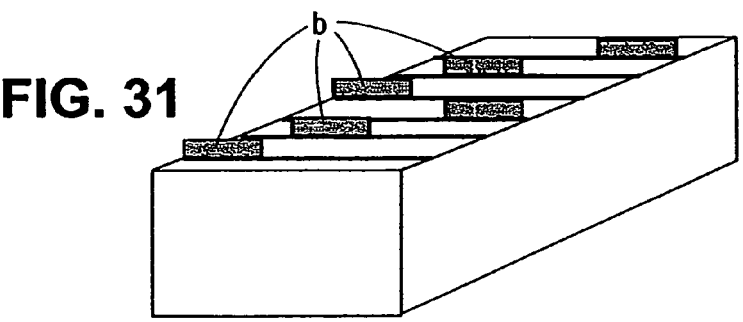
FIG. 31

TABBED STORAGE SLEEVE AND RETRIEVAL SYSTEM FOR PLANAR OBJECTS AND DISC MEDIA

CROSS REFERENCE TO RELATED APPLICATION

This application is a continuation-in-part of the U.S. patent application entitled TABBED STORAGE SLEEVES having U.S. Ser. No. 09/757,596, and filed on Jun. 27, 2001 now abandoned.

BACKGROUND OF THE INVENTION

1. Field of the Invention

This invention relates to tabbed storage devices for storing one or more planar files, records, cds, dvds or electronic disk media.

2. Description of the Related Art

Manufacturers of electronic disk storage media such as a cd, dvd, video and mini-discs and other media formats have commonly resorted to packaging their product in paper or vinyl sleeves wherein the media disk or record is placed in a protective pocket of the sleeve without any means or intended means to allow for a method of a filing. Such a sleeve has a pocket which is opened at one end for inserting or removing articles. This type of sleeve suffers from the following disadvantages:

(a) the sleeve is too thin to write on the edges so as to identify the sleeve when laid on its side or when stacked on top one another or placed in a file amongst a large quantity of sleeves;

(b) to identify a sleeve, a user scribes the title on the face or back of the sleeve. Identifying a desired sleeve quickly can be a problem, for example when the sleeve is laid face down or stacked amongst others. The user must sort through multiple sleeves to identify the desired sleeve; and (c) because these sleeves do not lend themselves to ease of accessibility, use of such sleeves in storage methods can be expensive and time-consuming where large volumes of articles need to be archived.

U.S. Pat. No. 5,695,219 discloses an index tab system for archiving and retrieving the record or disk wherein an index tab is a separate component which clips or adheres onto the disk or sleeve. The index tab system allows for a flexible indexing system which is removable, but suffers from the following disadvantages:

(a) the index component is a separate item and not a part of the sleeve itself;

(b) the index component can be easily lost, destroyed and/or difficult to affix to the sleeve, as well as awkward and slow to assemble; and (c) the index component is an added cost and thus not part of the whole.

Fragile plastic jewel cases allow for indexing, and provide a degree of protection for their contents. By nature of the thickness of the edge of a jewel case, a user can scribe and view a title on the spine of the jewel case, allowing the user to file the jewel case according to the title on the edge of the jewel case itself. Jewel cases suffer from the following disadvantages:

(a) although jewel cases have thick enough spines to scribe a title on, they are cumbersome to archive because they take up a lot of space, and when placed in a drawer or file cabinet a user is unable to distinguish one title from another (especially if the file is too high above the visual surface or too far back in the drawer) because the user cannot read the spine edge where the title is scribed upon, especially if the jewel cases are perpendicular to the base of the file drawer and the viewer. Nothing protrudes from the jewel case to make the jewel case more visible and accessible;

(b) jewel cases are made of plastic, are fragile and prone to damage and breakage, especially when dropped;

(c) jewel cases are difficult to open and insert because of the extra steps required to open and close the lid and pop the disk out by pressing down on the locking mechanism that keeps the disk in place with one hand while removing the disk with the other hand; and (d) jewel cases are expensive to manufacture and consists of three components: (1) retainer (2) lid (3) printed jacket to identify the contents stored inside.

U.S. Pat. No. 5,447,334 discloses the use of tabbed file folders for standard paper products, but does not address the unique storage system requirements of electronic disk media. This patent suffers from the following disadvantages:

(a) does not have a fixed pocket to store CDs, DVDs, Video Discs and other thin planar and electronic media objects; and (b) too large and bulky.

SUMMARY OF THE INVENTION

A storage device in accordance with embodiments of the present invention can allow for archival of various articles, particular planar articles such as electronic media, records, papers, etc. Such a storage device can comprise a sleeve having a pocket for receiving said article and one or more tabs connected with the sleeve. In some embodiments, said one or more tabs can be removably connected with the sleeve, while in other embodiments, multiple sleeves can have one or more tabs formed in various shapes, sizes, and/or colors and arranged in varying positions along an edge of the sleeve. The storage device can be used, for example, in a system allowing for archival of various articles such that the location of an article can be readily identified by identifying one or more tabs connected with the corresponding sleeve.

BRIEF DESCRIPTION OF THE DRAWINGS

Further details of the present invention are explained with the help of the attached drawings in which:

FIG. 1 shows a flat sheet of substrate for forming a tabbed storage sleeve having selectably removable tabs in accordance with one embodiment of the present invention;

FIG. 2 is a cross-section of the flat sheet of FIG. 1;

FIG. 3 is a side view of the flat sheet of FIG. 1 showing scored depressions;

FIG. 4 is a frontal perspective view of the flat sheet of FIG. 1 showing two side flaps folding inward and a lower half folding upwards to form the pocket;

FIG. 21 shows a flat sheet of substrate for forming a tabbed storage sleeve in accordance with an alternative embodiment of the present invention;

FIG. 22 is a cross-section of the flat sheet of FIG. 21;

FIG. 23 is a side view of the flat sheet of FIG. 21 showing scored depressions;

FIG. 24 is a frontal perspective view of the flat sheet of FIG. 1 showing two side flaps folding inward and a lower half folding upwards to form the pocket;

FIG. 25 is a perspective view of the sleeve formed as shown in FIG. 24;

FIG. 26 is a frontal view of the sleeve formed as shown in FIG. 24;

FIG. 27 is a back view of the sleeve formed as shown in FIG. 24;

FIG. 28 is a perspective top-down view of the sleeve formed as shown in FIG. 24;

FIG. 29 is a perspective bottom-up view of the sleeve formed as shown in FIG. 24 with tab bent relative to the sleeve;

FIG. 30 is a front view of the sleeve formed as shown in FIG. 24;

FIG. 31 is a perspective of a system for storing multiple tabbed storage sleeves as shown in FIGS. 21–30 in accordance with an alternative embodiment of the present invention;

FIG. 33b is a frontal view of an alternative embodiment having a single tab extending from an edge at a position along the edge different from a positioning of the tab on the edge of the sleeve of FIG. 33a;

DETAILED DESCRIPTION OF THE DRAWINGS

FIGS. 1–10 illustrate a tabbed storage sleeve in accordance with one embodiment of the present invention. The sleeve is made of a flat sheet having a substrate that when molded or folded along a scored or otherwise defined line l, can form a pocket j which can protect contents stored inside the pocket j. The substrate can be either semi-flexible or rigid in construction. A semi-flexible substrate can be formed from one or more of flexible plastic, vinyl, synthetic resin, press material, and paper pulp, and a rigid substrate can be formed from more durable plastic. Optionally, where the substrate is formed from press material, the press material can comprise recycled paper mixed with an adhesive base and pressed together to form a die a from which a flat sheet as shown in FIG. 1 can be formed. Alternatively, other materials can be adhered and pressed together to form the die a. Other substrates that are durable and flexible can comprise poly-ethylene-tere-phthalate (PET-hyphens here supplied to facilitate pronunciation) available from Eastman Chemical Co. of Kingsport, Tenn., or any other material that can act as a protective barrier while having sufficient rigidity to retain one or more tabs b (such as polyethylene, polypropylene, synthetic resin, vinyl, various impregnated or laminated fibrous materials, various plasticized materials, cardboard, paper, etc.). Any of these materials can be scribed upon with a tool, pencil or ink to more readily identify the one or more tabs b and sleeve.

Figure 5:
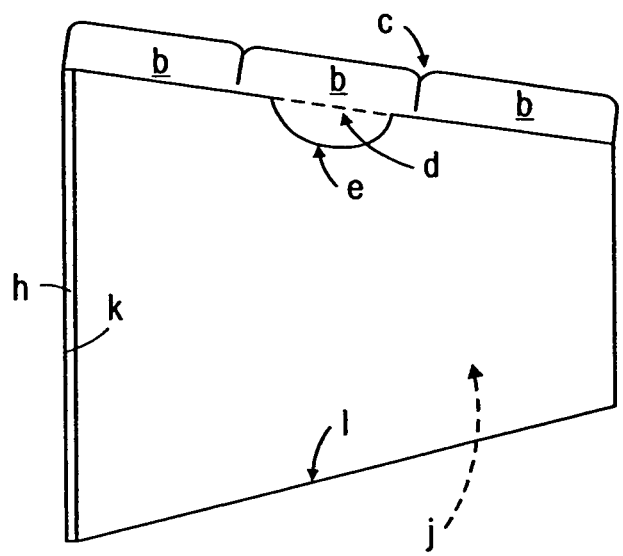
FIG. 5 is a perspective view of the sleeve formed as shown in FIG. 4.
Figure 6:
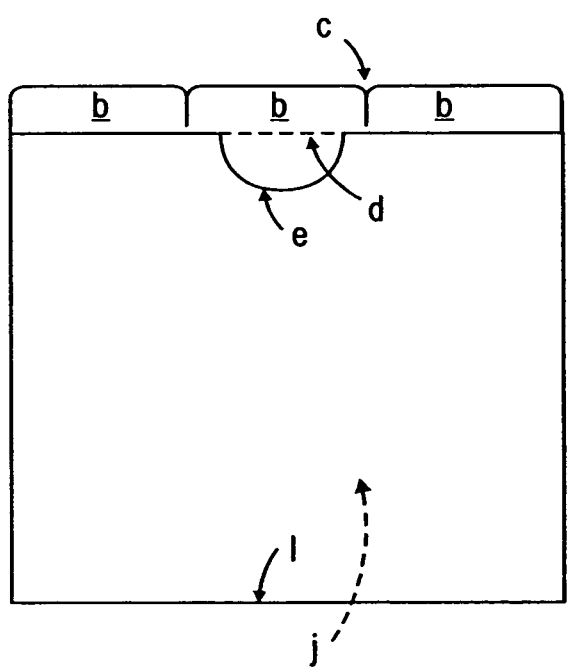
FIG. 6 is a frontal view of the sleeve formed as shown in FIG. 4.
Figure 7:
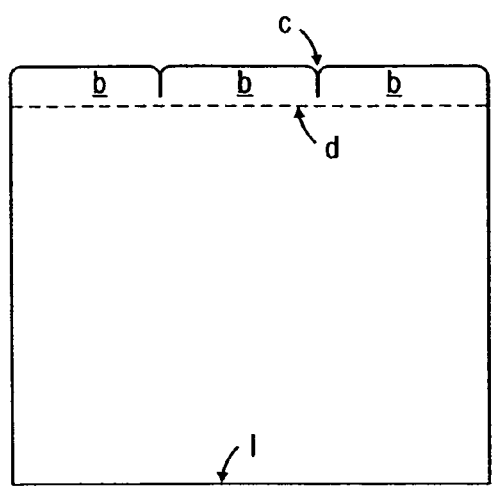
FIG. 7 is a back view of the sleeve formed as shown in FIG. 4.

The flat sheet shown in FIG. 1 comprises one or more removable tabs b adapted to be written to or otherwise marked for identifying a tabbed storage sleeve formed from the flat sheet. The one or more removable tabs b can be separated along a tab cut c, and connected with the flat sheet along a scored depression d at the base of the one or more tabs b. The scored depression d can be perforated, allowing one or more of the tabs b to be torn or broken off and removed. Two side flaps f, one on each side of the flat sheet can each be folded inward ff (shown in FIG. 4) along a scored depression h or otherwise define line to form the sides of the pocket j or the edge of the sleeve. The scored depressions h can allow the flap f to fold inward ff over a rear panel of the sleeve more easily and accommodates expansion of the pocket j as shown in FIG. 5 (along the edge k) so that more than one disk could be placed into the pocket j. A scored depression l along a base of the sleeve can form a hinge which enables the lower half m of the flat sheet (that is, the front panel of the sleeve) to fold upward to form the pocket j. One or more notches e can optionally be formed in the flat sheet such that when a sleeve is formed, the notch e allows a user to insert and remove the contents more easily, as shown FIG. 12, and also allows the user to view the contents in the container sleeve.

The flat sheet shown in FIG. 1 can be either molded, die-cut or cut out with a sharp tool such as a razor blade, knife or scissor, etc. As shown in FIG. 4, the front panel m of the sleeve is folded upwards along the respective scored hinged depression l while the two side flaps f are folded inwards ff along the respective scored hinged depressions h. An adhesive can be placed on the front side (as folded) of the flaps f and the front panel m of the sleeve can be folded upward along the scored hinged depression l and pressed against the front side of the flaps f to form a pocket j. The adhesive can, for example, be any type of resin that adheres plastic, paper or synthetic resins with sufficient adhesion capabilities to adhere the lower half of the sleeve m to the flaps f such that the pocket j is retained. For example, common suppliers of adhesive materials are 3M Corporation and Elmer's Glue (registered trademark) either in a liquid or adhesive tape format.

Figure 8:
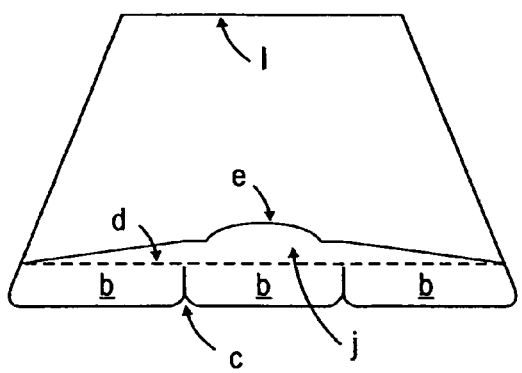
FIG. 8 is a perspective top-down view of the sleeve formed as shown in FIG. 4.
Figure 9:
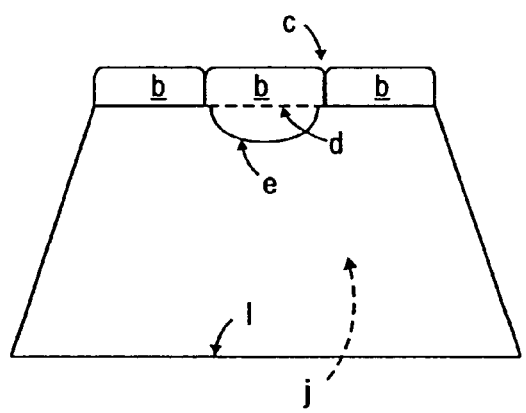
FIG. 9 is a perspective bottom-up view of the sleeve formed as shown in FIG. 4 with selectably removable tabs bent relative to the sleeve.
Figure 10:
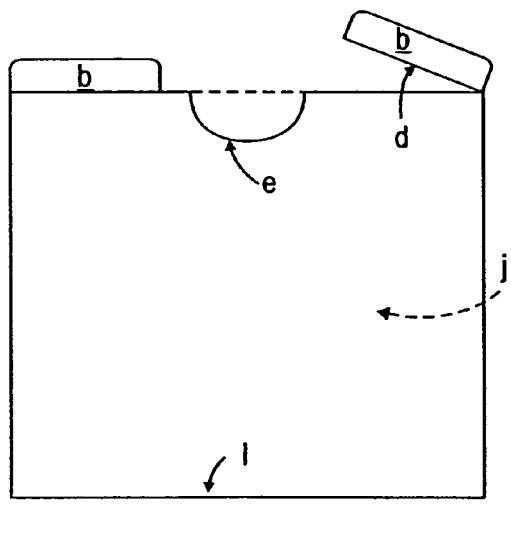
FIG. 10 is a front view of the sleeve formed as shown in FIG. 4 illustrating selective removal of two of the three selectably removable tabs.
Figure 12:
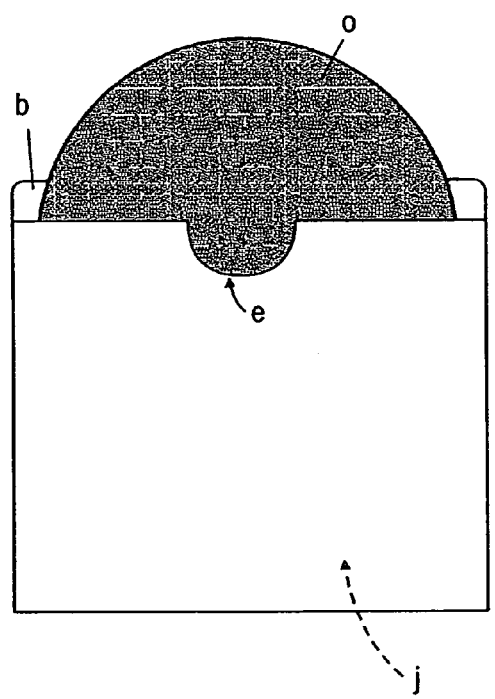
FIG. 12 is a frontal view of a disk media partially inserted into a tabbed storage sleeve.

Once allowed sufficient time to adhere and dry, a pocket j as shown in FIG. 8 can be formed. A disk o or other contents can be placed in the pocket j as shown in FIG. 12. The one or more tabs b that protrude from the top edge of the sleeve can be formed from the flat sheet and can include a scored depression along the base of the one or more tabs b. As shown in FIG. 10, the scored depression d can be a perforation or include a perforation allowing a user to easily tear or break unused tabs n from the sleeve with relative ease while leaving a clean edge d remaining on the sleeve, as well as one or more remaining tabs b bound to the sleeve with sufficient strength to not separate from the sleeve.

Figure 13:
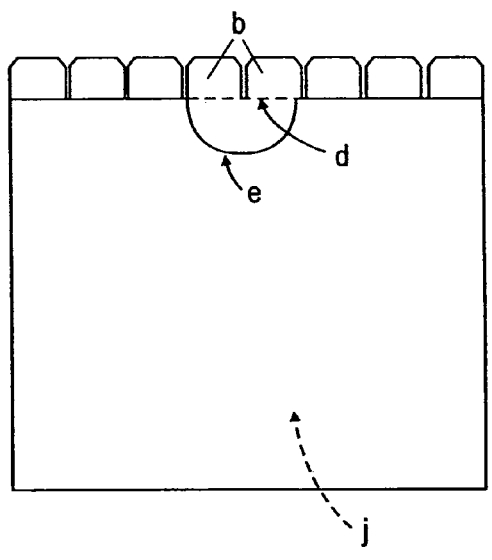
FIG. 13 is a frontal view of an alternative embodiment of a tabbed storage sleeve having eight selectably removable tabs.

A sleeve in accordance with embodiment of the present invention can have any number of tabs having multiplicity of different shapes, sizes and colors. For example, the sleeve shown in FIG. 13 can include eight tabs having slightly rounded corners at a distal end of each tab. In other embodiments, the tabs can have differing shapes amongst the entire set of tabs, or multiple subsets of tabs can have differing shapes, sizes and colors between them. For example, the sleeve can include a subset of prominently sized tabs, allowing for important or frequently used contents to be readily identified when placed among a plurality of sleeves. The width of the sleeve and the width of each tab can define the number of tabs b that can be placed across the sleeve.

In an alternative embodiment of the present invention shown in FIGS. 21–40, the flat sheet comprises one or more tabs b fixedly connected with the flat sheet, and subsequently a sleeve formed from the flat sheet, for scribing and identifying the sleeve in use. The flat sheet can comprise a substrate as described above in reference to FIGS. 1–20. Further, a sleeve can be formed similarly as described in FIGS. 1–20, excepting that the one or more tabs c are fixedly connected with the sleeve. The one or more tabs c fixedly connected with the sleeve can be formed along the width of the sleeve, as shown in FIGS. 21–30, at any point along the width of the sleeve. Thus, as shown in FIG. 31, multiple sleeves can be arranged having tabs b positioned slightly offset along the width of the sleeve relative to tabs c on additional sleeves such that when placed or used in a system, the sleeve does not obscure the additional sleeve placed or stacked such that the sleeve abuts or is closely spaced to the additional sleeve. A system in accordance with the present invention includes multiple sleeves arranged so that one or more tabs of abutting or closely spaced sleeves do not visually obstruct one another.

Figure 14:
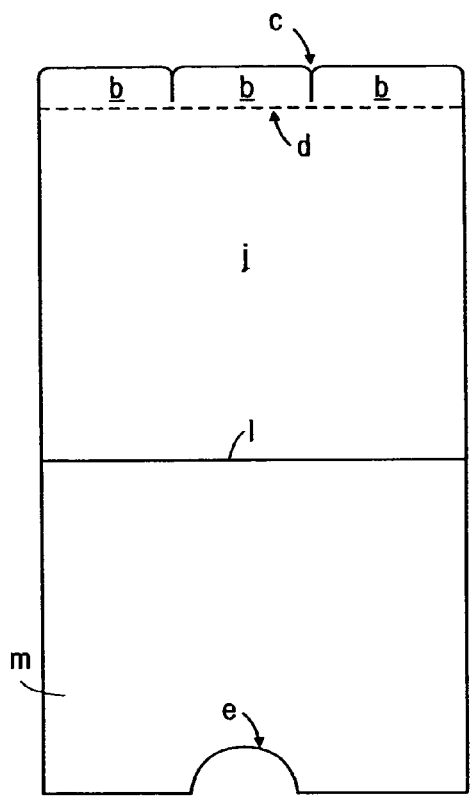
FIG. 14 shows a flat sheet of substrate for forming a tabbed storage sleeve in accordance with an alternative embodiment of the present invention wherein an adhesive supplants side flaps.
Figure 15:
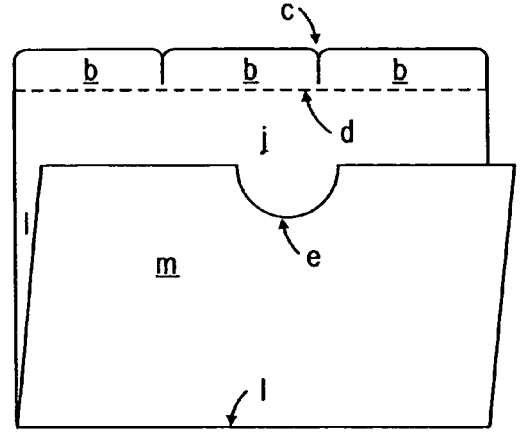
FIG. 15 is a partial perspective front view of the flat sheet of FIG. 14 forming a tabbed storage sleeve.
Figure 17:
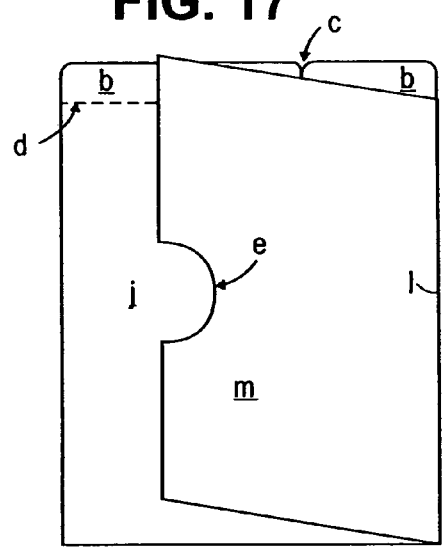
FIG. 17 is a partial perspective front view of the flat sheet of FIG. 16 forming a tabbed storage sleeve.
Figure 35:
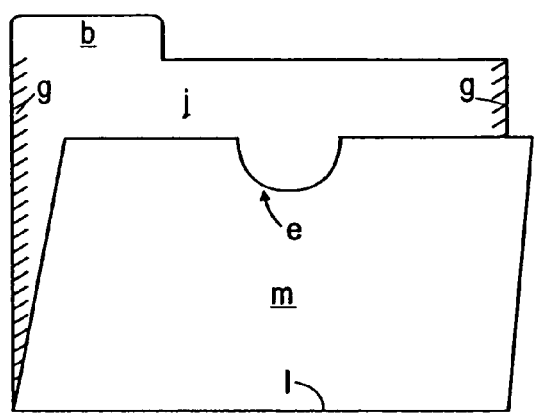
FIG. 35 is a partial perspective front view of the flat sheet of FIG. 34 forming a tabbed storage sleeve.
Figure 37:
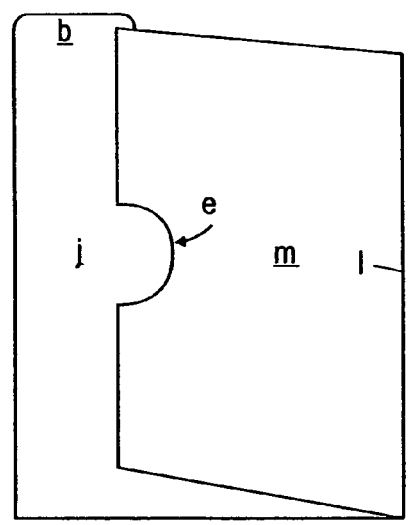
FIG. 37 is a partial perspective front view of the flat sheet of FIG. 36 forming a tabbed storage sleeve.
Figure 36:
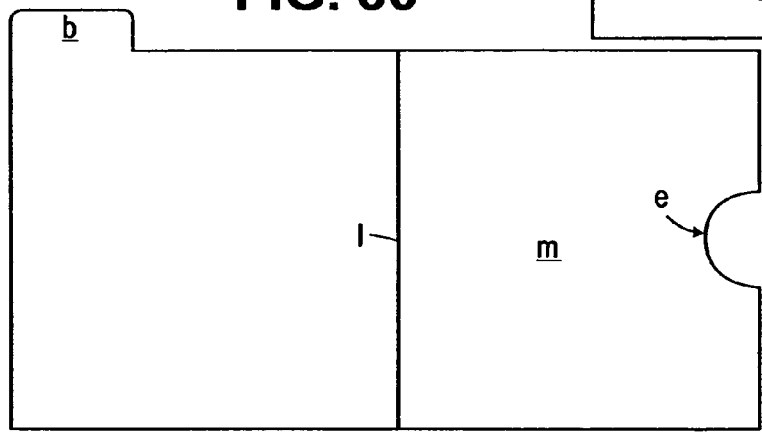
FIG. 36 is a frontal view of yet another embodiment of a flat sheet of substrate for forming a tabbed storage sleeve wherein a tab is placed along an edge adjacent to an opening in the sleeve.
Figure 38:
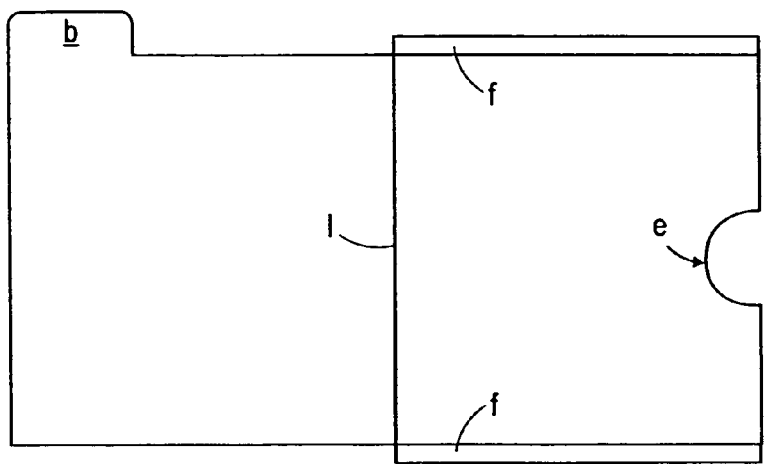
FIGS. 38–40 shows an alternative embodiment of the tabbed storage sleeve having side flaps and an opening adjacent the tabs.

In an alternative embodiment, the flat sheet does not comprise flaps f, but rather the rear panel of the pocket j is glued using an adhesive g (as shown in FIGS. 24 and 35) or otherwise fastened directly to the front panel along an side edge I of the panels, as shown in FIGS. 14–17 and FIGS. 34–37. As shown in FIGS. 15 and 17 (and FIGS. 35 and 37) the front panel m of the sleeve is folded upward along the hinged or scored line l, and with the adhesive resin g placed on the side edges I of the rear and/or front panels of the sleeve and the rear and front panels are pressed tightly with the one or more tabs b extending outwards from the rear panel of the pocket j. The sides of the flat sheet need not include scored depressions or be otherwise filmable, because the front panel m is adhered directly to the rear panel. The adhesive can cover an approximate ½ inch wide band per side, thus in this embodiment, the flat sheet would need to be 1 inch wider than for the embodiment shown in FIGS. 1–10. Foregoing the use of flaps f can limit the ability to place more than one disk or planar material in the sleeve. Further, there is an increased likelihood the disk or contents will pry the adhesive loose after repeated insertions and can impede the ability to quickly insert and remove the sleeve's contents.

Figure 16:
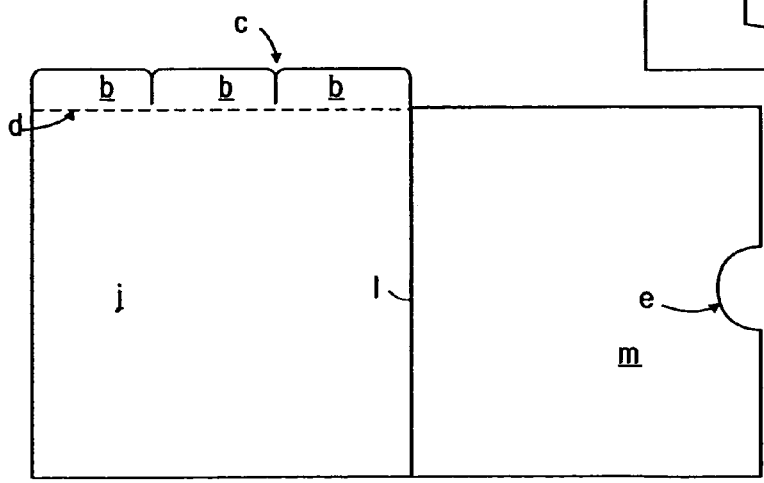
FIG. 16 is a frontal view of yet another embodiment of a flat sheet of substrate for forming a tabbed storage sleeve wherein selectably removable tabs are placed along an edge adjacent to an opening in the sleeve.
Figure 18:
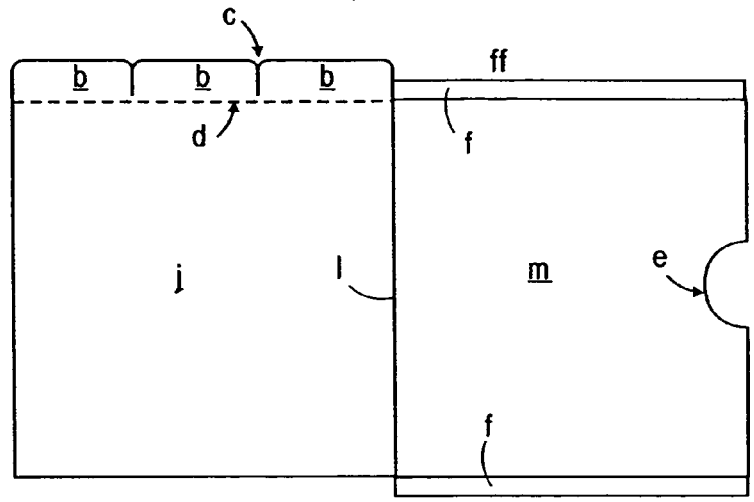
FIGS. 18–20 shows an alternative embodiment of the tabbed storage sleeve having side flaps and an opening adjacent the tabs.
Figure 19:
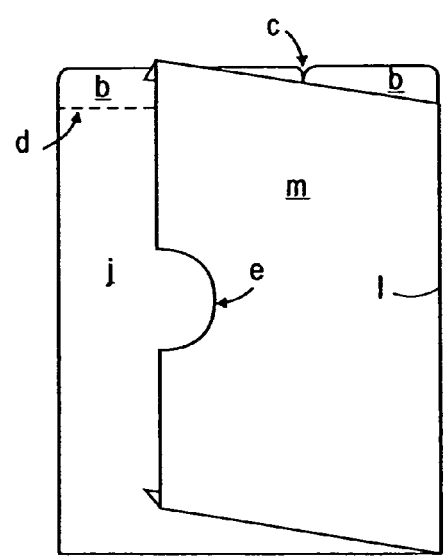
Figure 20:
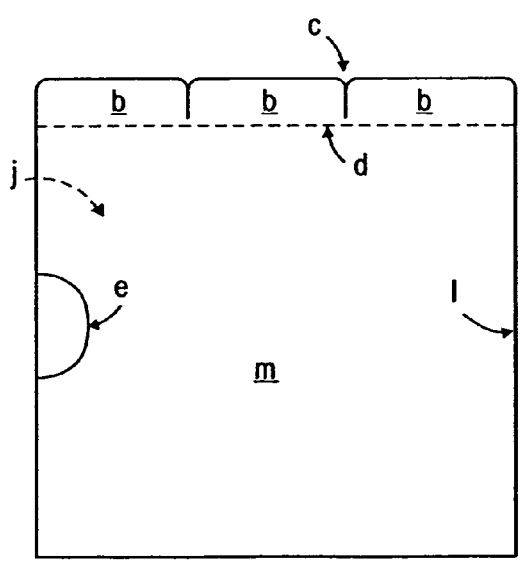
Figure 32:
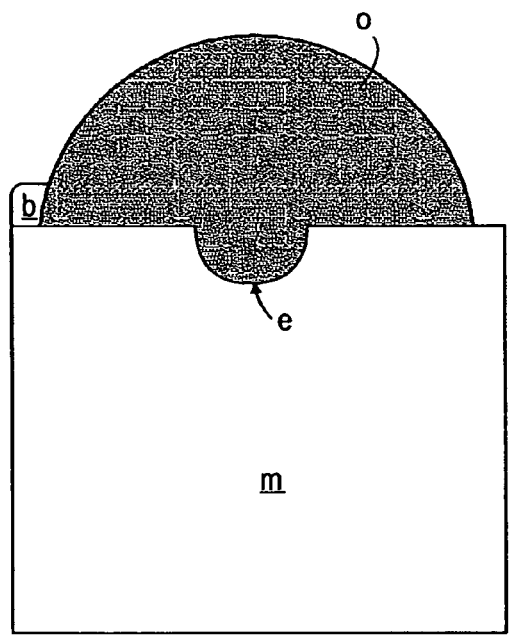
FIG. 32 is a frontal view of a disk media partially inserted into a tabbed storage sleeve.
Figure 33A:
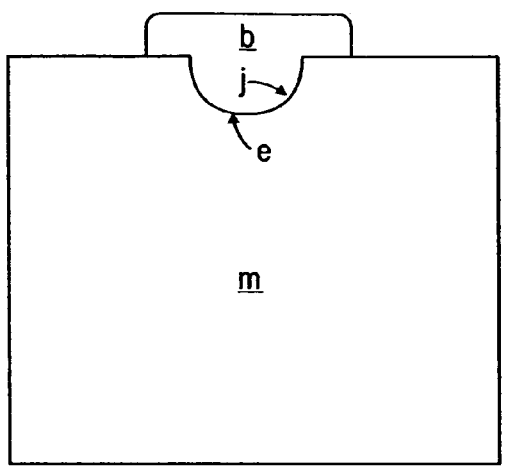
FIG. 33a is a frontal view of an alternative embodiment having a single tab extending from an edge of the sleeve.
Figure 33B:
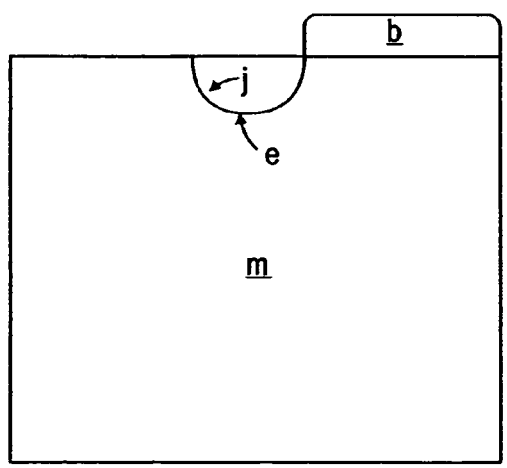
Figure 34:
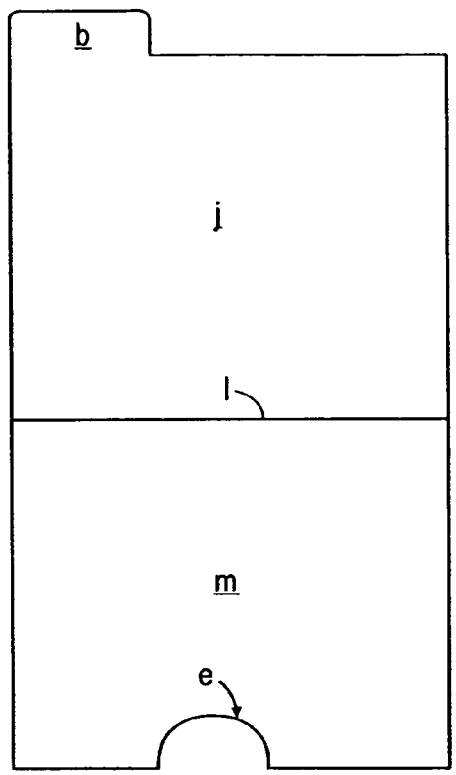
FIG. 34 shows a flat sheet of substrate for forming a tabbed storage sleeve in accordance with an alternative embodiment of the present invention wherein an adhesive supplants side flaps.
Figure 40:
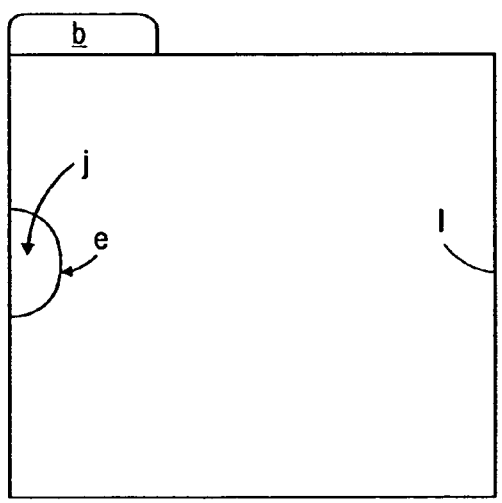
Figure 39:
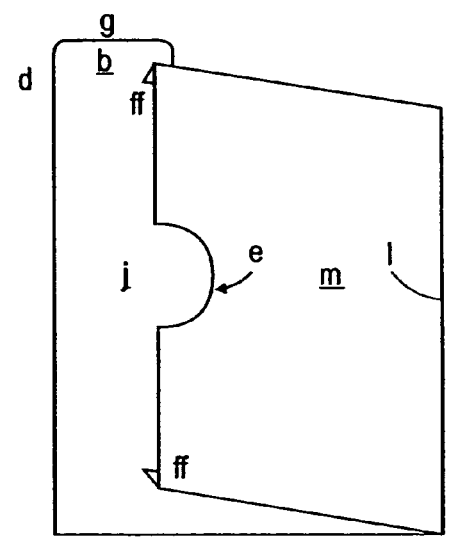

FIGS. 14 and 15 (and FIGS. 34 and 35) show the tabs and the opening of the pocket facing the top of the sleeve and having no flaps. FIGS. 16 and 17 (and FIGS. 36 and 37) show an another embodiment wherein the one or more tabs b are formed along an edge of the sleeve adjacent the opening of the sleeve and having no flaps. Likewise, FIGS. 18–20 (and FIGS. 38–40) show an alternative placement of the one or more tabs b wherein the one or more tabs b are placed adjacent to the opening of the pocket or turned 90 degrees counter or counter clockwise from the position of the pocket opening as in FIGS. 1–13. In such an embodiment, the sleeve can be positioned, for example in a system, such that the opening of the pocket j is either facing the left (as shown in FIGS. 20 and 40) or right, depending on which adjacent edge the one or more tabs b are placed. The embodiment of FIGS. 18–20 (and FIGS. 38–40) allow the user to insert and remove the contents of the pocket j from the side. There are a multiplicity of other arrangements of the opening of the pocket j of the sleeve relative to the position and placement of the one or more tabs b. Further, in still other embodiments more than one edge can include one or more tabs. For example, combining the embodiment shown in FIG. 14 and FIG. 16 (or FIG. 6 and FIG. 20) can allow tabs formed at an opening as well as along an adjacent edge, allowing a system utilizing such sleeves to work in multiple ways. One of ordinary skill in the art can appreciate the different configuration and placement of one or more tabs of a sleeve relative to an opening of the sleeve.

OPERATION OF THE INVENTION

Embodiments of the present invention can allow the user to squeeze the sides of the sleeve so that the pocket j opens up and the contents (for example, in FIGS. 12 and 32 a disk o) can be inserted or easily retrieved from the sleeve. The sleeve can act as a storage device and protective barrier from undesirable elements that could harm the contents held within the pocket j. The user can optionally scribe a title of the stored contents on at least one of the one or more tabs b with pencil, ink and any other marking type utility and can optionally tear or breaks any number of remaining tabs. In alternative embodiments having fixedly connected tabs b, a sleeve having one or more tabs in desired positions along the width of the sleeve can be selected for use and optionally at least one of the one or more tabs b can be inscribed.

Figure 11:
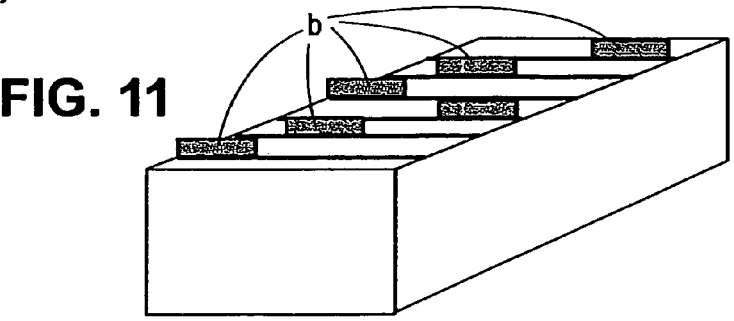
FIG. 11 is a perspective of a system for storing multiple tabbed storage sleeves as shown in FIGS. 1–10 in accordance with one embodiment of the present invention.

The base d of the one or more tabs b can be impressed with a heavy score and/or perforated line c to ease the removal and clean tearing or breaking of one or more tabs n from the sleeve. FIG. 10 shows an example of a tab b partially broken-away n. Customizing an arrangement of the one or more tabs b can make a sleeve unique, or can allow the sleeve to stand out amongst other sleeves, for example when archived in a file, storage container, cabinet or other system (as shown in FIG. 11). To retrieve the sleeve and contents thereof in the future, the user can thumb through an indexed series of sleeves using the one or more tabs b looking for the desired title to locate the particular sleeve with its respective contents.

Once the desired sleeve is located, the user only needs to squeeze the sides of the sleeve so that the pocket opens up and a disk or other contents can be inserted into or removed from the pocket. Where a sleeve having a fixed tab b is used, the position, shape, size, and color (etc.) of the one or more tabs b can differ relative to one or more tabs c on other sleeves. The differing position, shape, size and color of the one or more tabs b of multiple sleeves is can enable a user to differentiate one sleeve and its contents therein from another sleeve.

In spite of the variety of devices presently available in the marketplace, consumers still face many problems when it comes to managing their disk/media inventory economically and efficiently. Embodiments of the present invention can allow a consumer to quickly archive and/or retrieve selected disk(s) or other contents economically and efficiently. For example, this invention can allow large volumes of disk media, such as CDs or DVDs, to be managed efficiently and easily using a minimal amount of space. Further, unlike other inventions which can be cumbersome and expensive, embodiment in accordance with the present invention can be considered a throw-away item, so that where a user mis-scribes a tab b, the sleeve can be thrown away and a new one used. A system using storage sleeves as described in said embodiments can allow for ease of archiving, indexing and retrieving for disk media or other planar contents as is not presently available, particularly in the electronic disk media industry, allowing for increased efficiency, speed of access and allowing for decreased cost of implementation. Such a system can be readily used and appreciated for example by such diverse users as librarians and music disc jockeys in such diverse settings as radio stations, music retail outlets, schools and libraries, and other archiving institutions.

The foregoing description of the present invention have been presented for purposes of illustration and description. It is not intended to be exhaustive or to limit the invention to the precise forms disclosed. Many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A system for storing an object so that the object can be filed among a plurality of objects occupying a minimal amount of space while allowing the object to be retrieved from among the plurality of objects, comprising:
   a plurality of sleeves, each sleeve comprising:
      a sheet of material having at least one fold-line, the fold-line defining a back and a front, wherein the back is joined with the front along the fold-line such that when the front is folded towards the back and the edges of the back and the front that extend from the fold-line are secured together, a pocket is formed having a length from the fold-line to a top edge of the back; and
      a plurality of detachable index tabs extending from the back along a tear line such that the plurality of detachable index tabs span end-to-end over the length of the pocket, each of the plurality of detachable index tabs having a surface for applying a label;
      wherein each of the plurality of detachable index tabs has substantially the same shape as each other of the plurality of detachable index tabs, so that a label sized to be placed on any one of the detachable index tabs can be placed on any other of the plurality of detachable index tabs;
   wherein the one or more index tabs for any two sleeves positioned adjacent to one another can be arranged so that at least one of the one or more index tabs for each of the two sleeves is visually unobstructed.

2. The system of claim 1, wherein the plurality of sleeves are adapted to receive the object and the object is one of a compact disc and a DVD.

* * * * *